US012811675B2

(12) United States Patent
Kapetanovic et al.

(10) Patent No.: US 12,811,675 B2
(45) Date of Patent: Nov. 24, 2026

(54) SATELLITE BACKSCATTER COMMUNICATION

(71) Applicant: Microsoft Technology Licensing, LLC, Redmond, WA (US)

(72) Inventors: Zerina Kapetanovic, Seattle, WA (US); Nissanka B. Priyantha, Redmond, WA (US); Ranveer Chandra, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 649 days.

(21) Appl. No.: 18/090,033

(22) Filed: Dec. 28, 2022

(65) Prior Publication Data

US 2024/0223270 A1 Jul. 4, 2024

(51) Int. Cl.

| | |
|---|---|
| ***H04B 7/14*** | (2006.01) |
| ***H04B 1/00*** | (2006.01) |
| ***H04B 7/06*** | (2006.01) |
| ***H04B 7/22*** | (2006.01) |
| ***H04L 27/02*** | (2006.01) |

(52) U.S. Cl.

CPC ............. *H04B 7/22* (2013.01); *H04B 1/0078* (2013.01); *H04B 7/0602* (2013.01); *H04L 27/02* (2013.01)

(58) Field of Classification Search

CPC ...... H04B 7/22; H04B 1/0078; H04B 7/0602; H04B 7/14; H04B 7/1851; H04B 7/18521; H04B 7/18528; H04B 7/18595; H04B 10/548; H04B 14/004; H04L 27/02; H04L 27/12; H04L 27/14; H02J 50/001; H02J 50/05

See application file for complete search history.

(56) References Cited

U.S. PATENT DOCUMENTS

| | | | | |
|---|---|---|---|---|
| 5,946,603 | A * | 8/1999 | Ibanez-Meier | H04B 7/18513 455/13.1 |
| 8,683,288 | B2 * | 3/2014 | Shen | H03M 13/255 714/790 |
| 9,154,217 | B1 | 10/2015 | Jain | |
| 12,143,143 | B2 * | 11/2024 | Yan | H04K 1/02 |
| 2019/0116078 | A1 * | 4/2019 | Gollakota | H04B 1/40 |
| 2020/0341152 | A1 * | 10/2020 | Yunck | B64G 1/1021 |

(Continued)

FOREIGN PATENT DOCUMENTS

DE 102020134160 A1 6/2022

OTHER PUBLICATIONS

International Search Report and Written Opinion received for PCT Application No. PCT/US2023/081476, Jun. 23, 2025, 13 pages.

(Continued)

*Primary Examiner* — Tuan Pham

(74) *Attorney, Agent, or Firm* — Rainier Patents, P.S.

(57) ABSTRACT

This document relates to communication by backscattering of satellite signals. One example includes a satellite backscatter transmitter having a first antenna configured to receive a radio frequency satellite signal, a modulator configured to modulate the radio frequency satellite signal to obtain a modulated radio frequency satellite signal, a digital logic circuit configured to selectively control the modulator to encode information according to a communication scheme, and a second antenna configured to passively retransmit the modulated radio frequency satellite signal to a receiver.

24 Claims, 13 Drawing Sheets

(56) References Cited

U.S. PATENT DOCUMENTS

| | | | | |
|---|---|---|---|---|
| 2021/0099198 | A1* | 4/2021 | Reynolds | H04L 27/2602 |
| 2022/0398887 | A1* | 12/2022 | Pandey | G06K 19/0723 |
| 2023/0296785 | A1* | 9/2023 | Sharma | G01S 19/215<br>342/357.59 |
| 2023/0366946 | A1* | 11/2023 | Ogirko | G01R 31/389 |
| 2024/0036188 | A1 | 2/2024 | Laabs | |
| 2024/0348388 | A1* | 10/2024 | Lindoff | G01S 13/86 |

OTHER PUBLICATIONS

International Preliminary Report on Patentability received for PCT Application No. PCT/US2023/081476, Jul. 10, 2025, 08 pages.

Liu, et al., (2013). Ambient backscatter: Wireless communication out of thin air. ACM SIGCOMM computer communication review, 43(4), 39-50, 12 pages.

Liu, et al., (2019). Next generation backscatter communication: systems, techniques, and applications. EURASIP Journal on Wireless Communications and Networking, 2019(1), 1-11, 11 pages.

* cited by examiner

SATELLITE BACKSCATTER COMMUNICATION

BACKGROUND

Different communication techniques have different advantages and disadvantages. For instance, wired communications tend to be relatively secure and can provide very high bandwidth, while infrared communications can be very useful for short-range applications such as controlling a television with a remote control. Radio frequency communications can be performed wirelessly at long ranges and have gained broad acceptance in computer networks using technologies such as Wi-Fi and Bluetooth.

One drawback of radio frequency communications is that a radio transmitter typically consumes relatively high amounts of power. Thus, a radio transmitter generally includes a power supply such as a wall plug or a battery. However, as discussed more below, there are many application scenarios where the relatively high power consumption of conventional radio transmitters is a significant disadvantage.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for communication by backscattering of satellite signals. One example includes a satellite backscatter transmitter having a first antenna configured to receive a radio frequency satellite signal. The satellite backscatter transmitter can also include a modulator configured to modulate the radio frequency satellite signal and a digital logic circuit configured to selectively control the modulator according to a communication scheme. The satellite backscatter transmitter can also include a second antenna configured to passively retransmit the modulated radio frequency satellite signal to a receiver.

Another example includes a satellite backscatter receiver having an antenna configured to receive a passively retransmitted radio frequency satellite signal and a radio circuit configured to extract information from the passively retransmitted satellite signal.

Another example includes a method or technique that can include receiving a radio frequency satellite signal and modulating the radio frequency satellite signal using a communication scheme to obtain a modulated radio frequency satellite signal. The method or technique can also include passively retransmitting the modulated radio frequency satellite signal.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

As noted above, radio frequency transmitters powered using conventional wall plugs or batteries are not well-suited for certain application scenarios. For instance, a user may wish to deploy a radio frequency transmitter in an area located far from the nearest power outlet (e.g., outdoors in a rural area), potentially leaving the radio frequency transmitter in a given location for a long period of time. While a battery can be employed to power the radio frequency transmitter, batteries tend to be heavy, expensive, and require periodic recharging.

One type of radio frequency communication that uses little or no power involves backscatter communication, where radio signals from another source are selectively reflected to encode information. For instance, television or frequency-modulated ("FM") radio signals can be selectively reflected by a backscatter transmitter to encode information that can be extracted by a receiver. However, existing radio backscatter solutions also have certain limitations for specific applications and use cases.

For instance, television and FM radio signals are not well-suited for backscatter communication in rural areas. These signals tend to predominate in urban areas because they originate from transmitters located near large population centers. As a consequence, rural areas may receive relatively low energy TV or FM radio signals that lack sufficient power for effective backscatter communication.

The disclosed implementations provide for backscatter communication using another source of radio frequency energy, satellites orbiting the earth. Because satellites are located above the earth, they emit radio frequency signals that are less likely to be attenuated by occlusions on earth, such as buildings or terrain. Thus, satellite radio frequency signals tend to have relatively high power in rural or remote locations as compared to television or FM radio signals. As a consequence, by backscattering radio frequency signals received from a satellite in low earth orbit or geostationary orbit, a satellite backscatter transmitter can effectively transmit information from many different locations on earth where TV or FM radio backscatter would be infeasible.

First Example Transmit Chain

Figure 1:
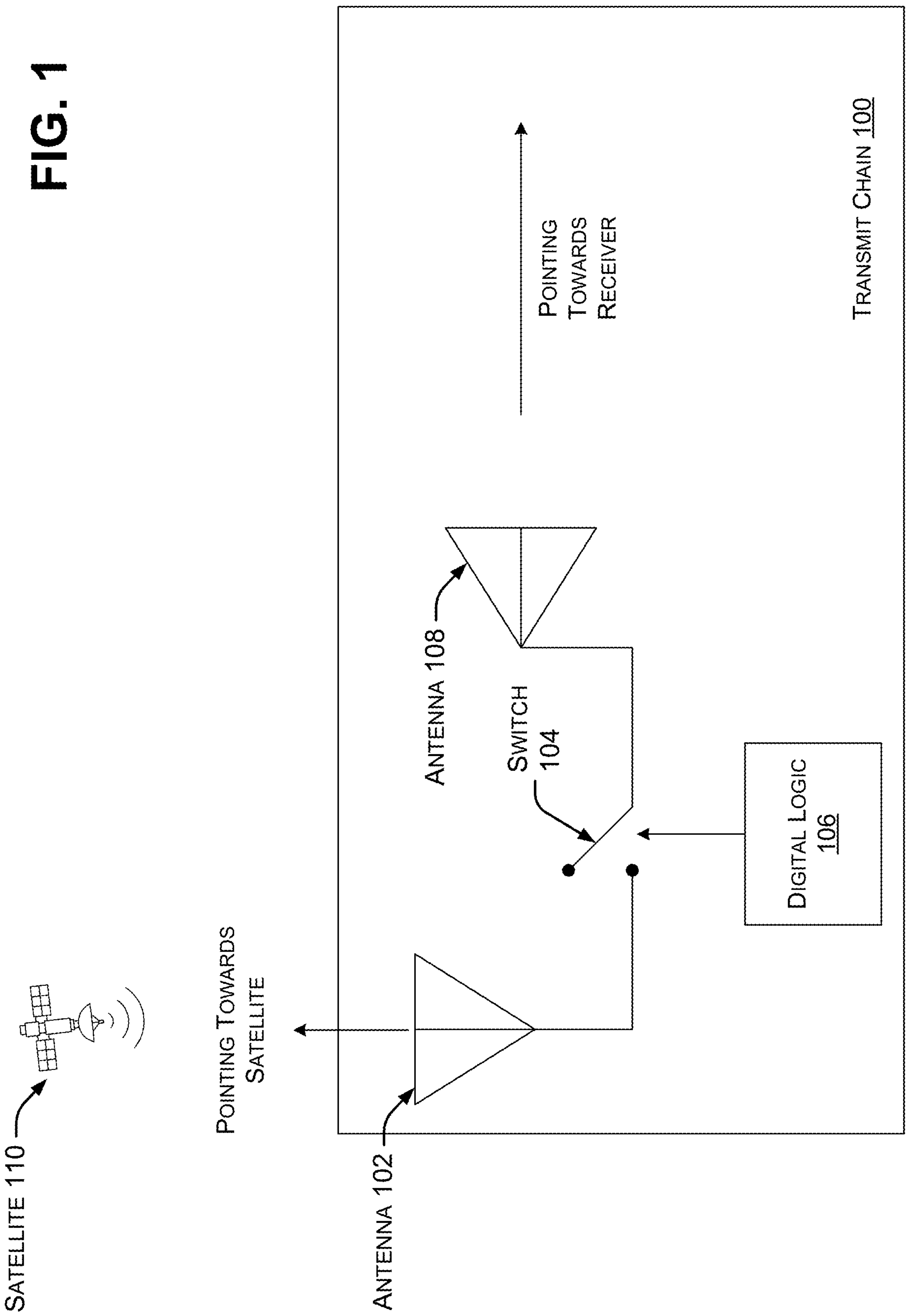
FIG. 1 illustrates an example transmit chain configuration for satellite backscatter communication, consistent with some implementations of the present concepts.

FIG. 1 illustrates a first example transmit chain 100 that can be employed to retransmit radio frequency satellite signals by backscattering. Transmit chain 100 includes a first antenna 102, a switch 104, digital logic 106, and a second antenna 108. Satellite 110 transmits a radio frequency satellite signal that is received and backscattered by transmit chain 100 as follows.

The first antenna 102 can be a directional antenna pointed toward satellite 110 to receive a radio frequency satellite signal. The radio frequency satellite signal can be selectively switched between an open circuit and the second antenna 108 using the switch 104. The switch can be controlled by the digital logic 106 to encode information according to a modulation scheme, e.g., on/off keying. When the switch is closed, the radio frequency satellite signal can be passively retransmitted from the second antenna toward a receiver. When the switch is open, the radio frequency satellite signal is not retransmitted. The digital logic can be implemented using a range of logic circuits, such as a low-power microcontroller, a field-programmable gate array ("FPGA"), a Raspberry Pi, etc.

Second Example Transmit Chain

Figure 2:
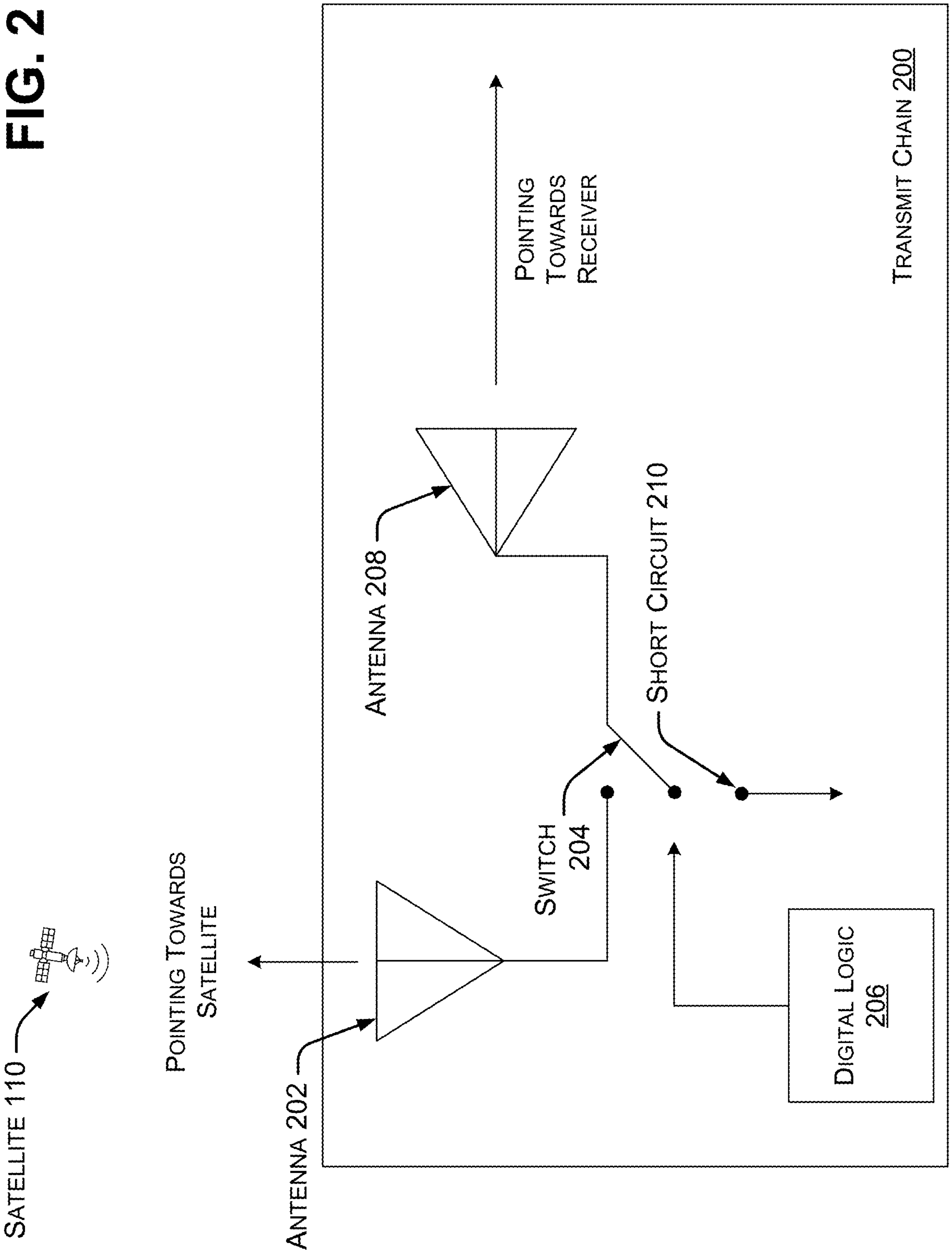
FIG. 2 illustrates another example transmit chain configuration for satellite backscatter communication, consistent with some implementations of the present concepts.

FIG. 2 illustrates a second example transmit chain 200 that can be employed to retransmit radio frequency satellite signals by backscattering. Transmit chain 200 includes a first antenna 202, a switch 204, digital logic 206, a second antenna 208, and a short circuit 210. Satellite 110 transmits a radio frequency satellite signal that is received and backscattered by transmit chain 200 as follows.

Generally speaking, the components of transmit chain 200 function similarly to those of transmit chain 100 described above with respect to FIG. 1. However, instead of switching to an open circuit, the switch 204 connects to the short circuit 210 to direct the radio frequency satellite signal away from the second antenna. Other implementations can selectively route the radio frequency satellite signal to a resistive shunt, vary the impedance of the circuit, or otherwise modulate the radio frequency satellite signal to encode information.

Example Receive Chain

Figure 3:
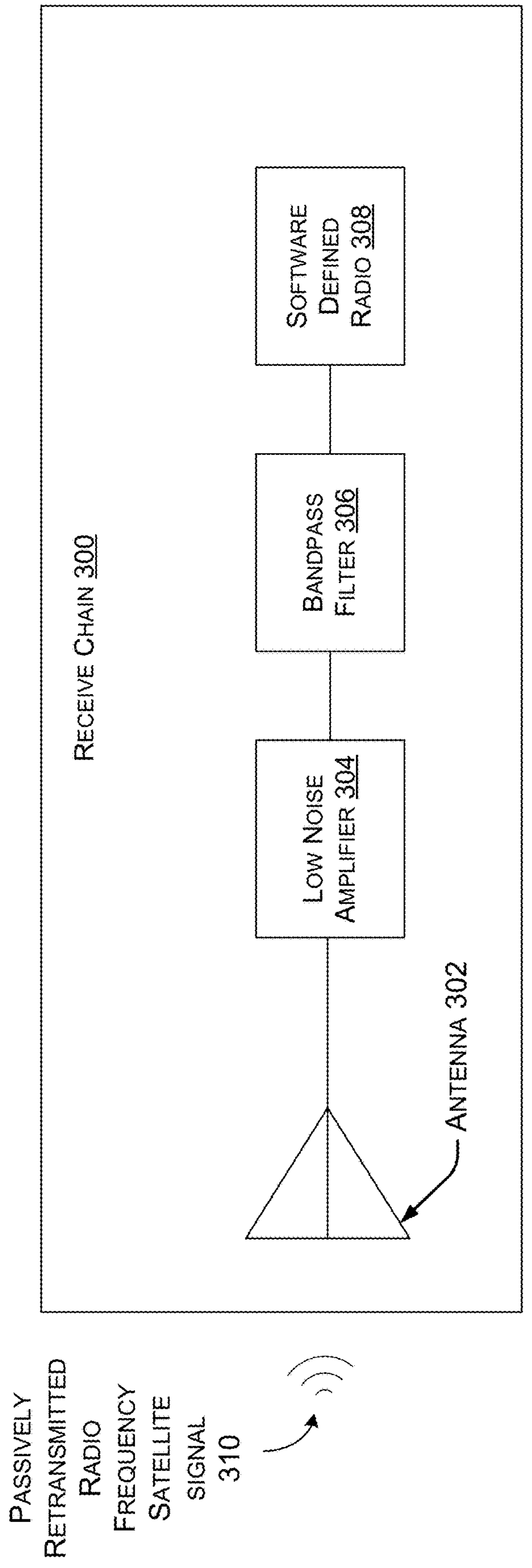
FIG. 3 illustrates an example receive chain configuration for satellite backscatter communication, consistent with some implementations of the disclosed techniques.

FIG. 3 illustrates an example receive chain 300, which includes an antenna 302, a low-noise amplifier 304, a bandpass filter 306, and a software-defined radio 308. The receive chain can receive a passively retransmitted radio frequency satellite signal 310, which can be retransmitted using a transmit chain such as those described above with respect to FIGS. 1 and 2. The passively retransmitted radio frequency satellite signal can encode information that can be extracted by the receive chain as follows.

The antenna 302 can be a directional antenna pointed toward a satellite backscatter transmitter. The low-noise amplifier 304 can amplify the passively retransmitted radio frequency satellite signal 310. The bandpass filter 306 can be tuned to a frequency band of the radio frequency satellite signal and attenuate signals outside of that frequency band, e.g., depending on the frequency characteristics of the particular satellite that is being retransmitted. The software-defined radio 308 can extract information from the retransmitted radio frequency signal according to the modulation scheme employed by the transmitter. In some cases, the software-defined radio can have access to characteristics of the original radio frequency satellite signal so that the software-defined radio can use cross-correlation techniques to extract information from the passively retransmitted radio frequency satellite signal.

First Example Communication Scenario

Figure 4:
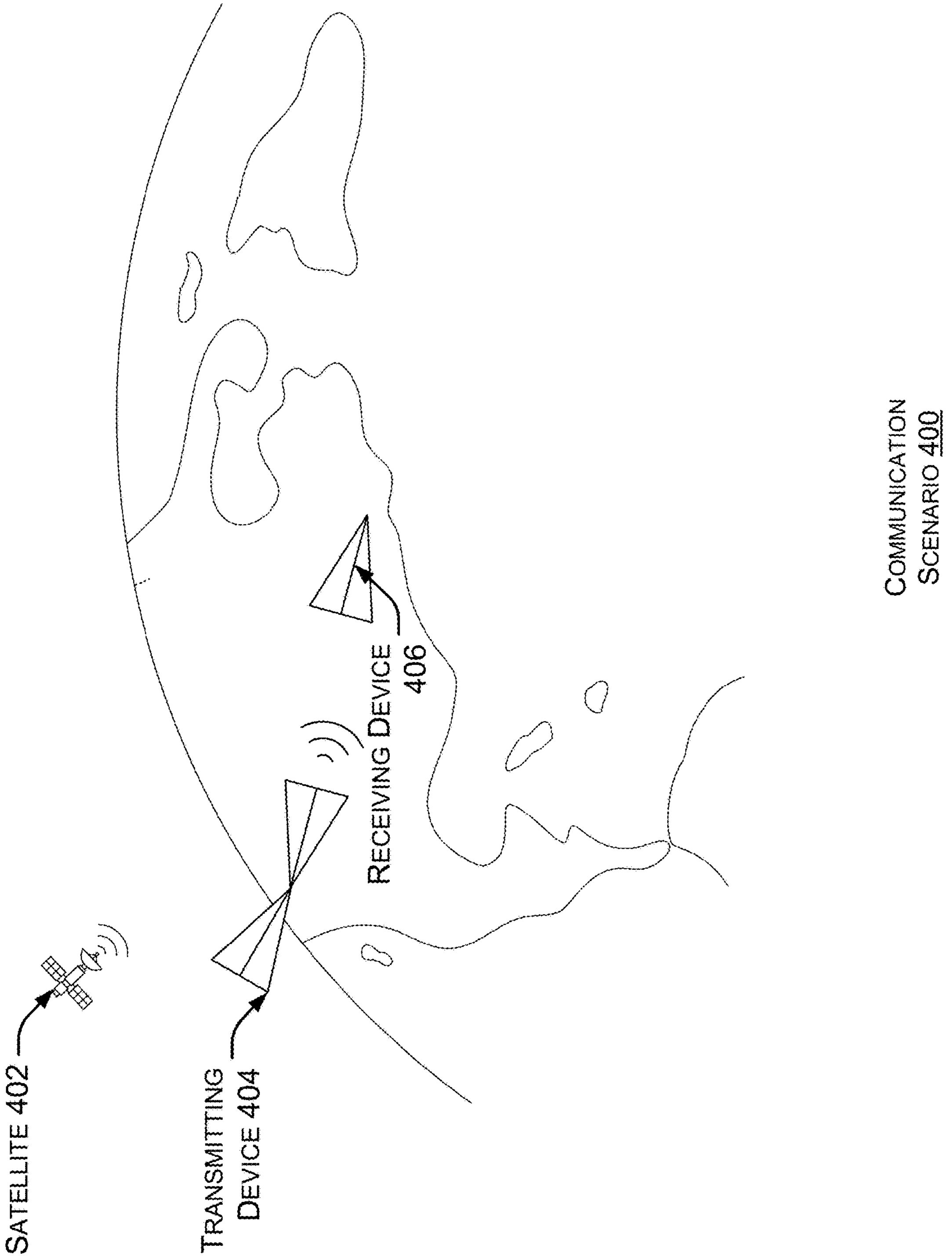
FIG. 4 illustrates an example satellite backscatter communication scenario, consistent with some implementations of the present concepts.

FIG. 4 illustrates a communication scenario 400. A satellite 402 transmits a radio frequency satellite signal that is received by a transmitting device 404, which can include a transmit chain as described previously with respect to FIGS. 1 and 2. The transmitting device passively retransmits the radio frequency satellite signal to a receiving device 406. In this example, the transmitting device can have a first antenna directed toward satellite 402, and a second antenna directed toward receiving device 406. The receiving device can have an antenna directed toward the transmitting device. In other implementations, omnidirectional antennas can be employed for transmitting and/or receiving backscattered radio frequency satellite signals in communication scenario 400.

Generally speaking, the transmitting device 404 and the receiving device 406 can be located where a line-of-sight exists between the two devices. Note that FIG. 4 is not intended to convey the actual distance between the transmitting device and the receiving device, but rather merely to convey that both devices are located on earth for this communication scenario. In practice, the transmitting device and the receiving device could be located relatively close to one another, e.g., within a few feet of one another. In addition, note that further scenarios can involve multiple transmitting devices transmitting information to a single receiving device.

Second Example Communication Scenario

Figure 5:
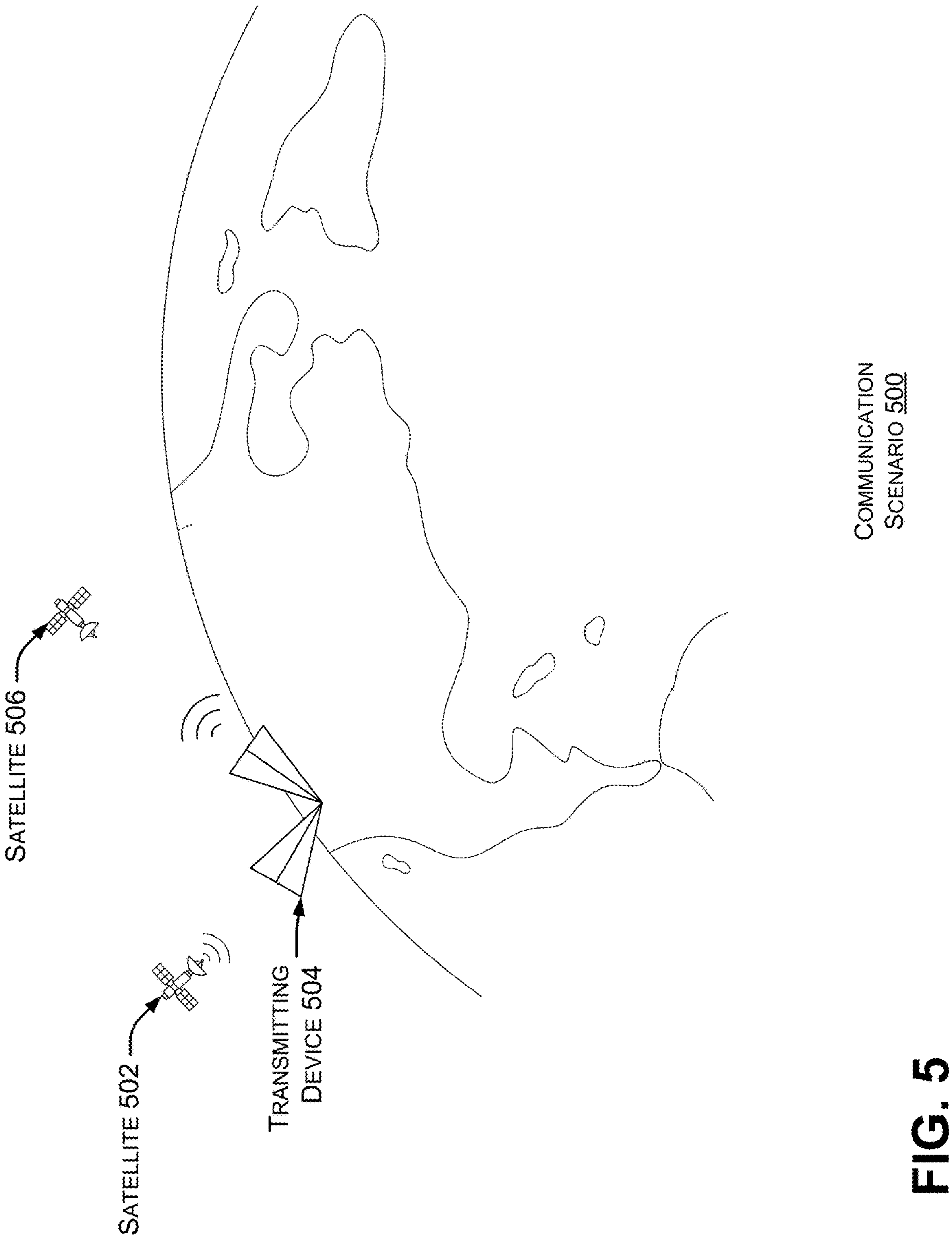
FIG. 5 illustrates another example satellite backscatter communication scenario, consistent with some implementations of the present concepts.

FIG. 5 illustrates a communication scenario 500. A satellite 502 transmits a radio frequency satellite signal that is received by transmitting device 504, which can include a transmit chain as described previously with respect to FIGS. 1 and 2. The transmitting device passively retransmits the radio frequency satellite signal to a satellite 506. Satellite 506 can include a receive chain as described above with respect to in FIG. 3. In some cases, satellite 506 can rebroadcast received information to one or more other receiving devices on earth (not shown).

In this example, the transmitting device 504 can have a first antenna directed toward satellite 502, and a second antenna directed toward satellite 506. Satellite 506 can have an antenna directed toward the transmitting device. In other implementations, omnidirectional antennas can be employed for transmitting and/or receiving backscattered radio frequency satellite signals in communication scenario 500.

Third Example Communication Scenario

Figure 6:
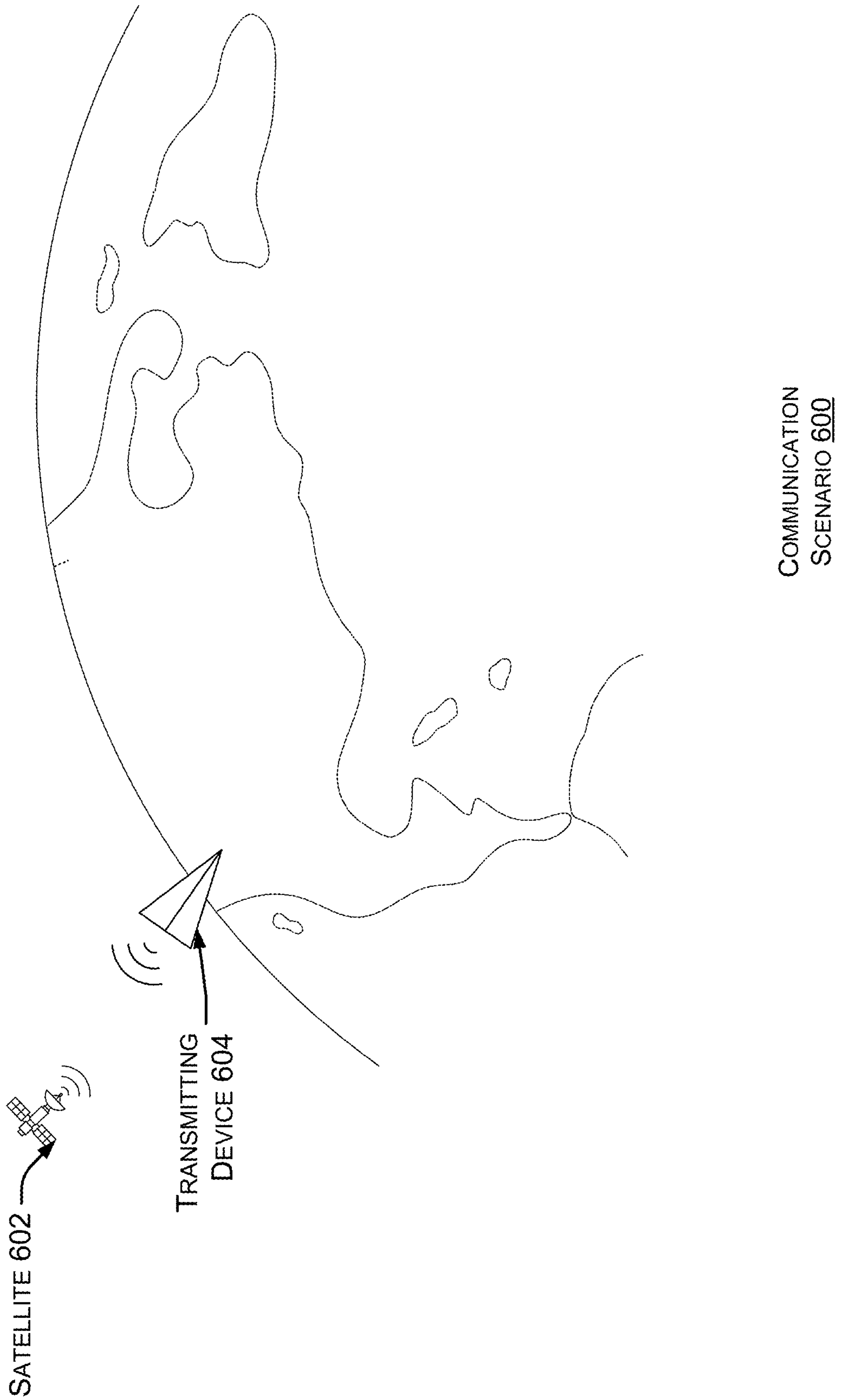
FIG. 6 illustrates another example satellite backscatter communication scenario, consistent with some implementations of the disclosed techniques.

FIG. 6 illustrates a communication scenario 600. A satellite 602 transmits a signal to a transmitting device 604, which can include a transmit chain as described previously with respect to FIGS. 1 and 2. The transmitting device passively retransmits the radio frequency satellite signal back to satellite 602. Satellite 602 can include a receive chain as described above with respect to in FIG. 3. In some cases, satellite 602 can rebroadcast received information to one or more receivers on earth (not shown).

In this example, the transmitting device 604 can have an antenna directed toward satellite 602, and satellite 602 can have an antenna directed toward the transmitting device. In other implementations, omnidirectional antennas can be employed for transmitting and/or receiving backscattered radio frequency satellite signals in communication scenario 600.

Experimental Results

Figure 7:
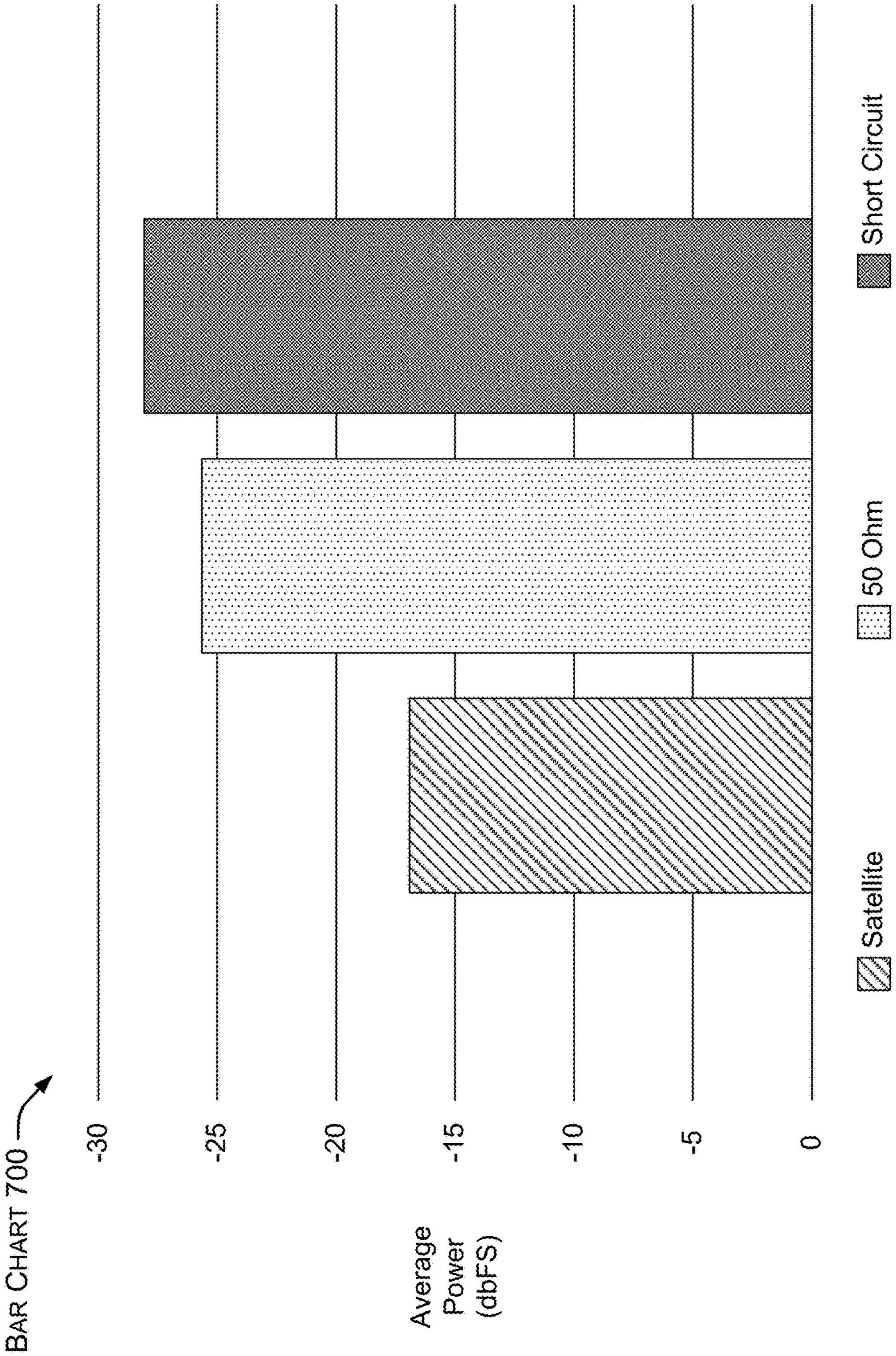
FIG. 7 illustrates a bar chart of average power achieved using a receive chain, consistent with some implementations of the disclosed techniques.

FIG. 7 illustrates a bar chart 700 illustrating the average power of a global positioning system (GPS) satellite signal in the L1 band (1575.42 MHz) using receive chain 300 as shown above in FIG. 3. Note that there is approximately 8 db difference, after amplification, between the average power of the signal and a 500 terminator. This difference in power indicates that by switching between those two sources, information bits can be wirelessly transmitted.

Figure 8A:
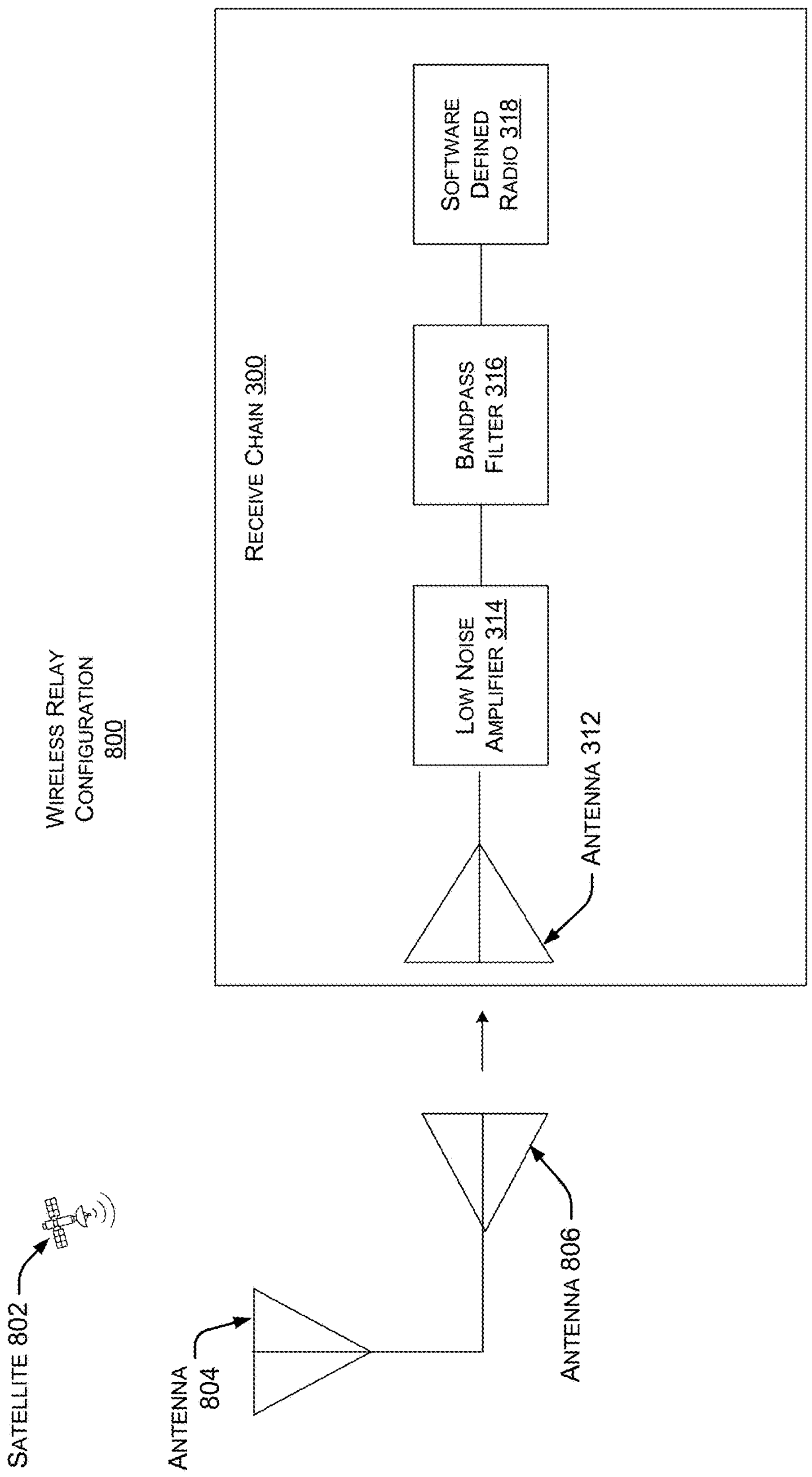
FIG. 8A illustrates an example wireless relay configuration for satellite backscatter communication, consistent with some implementations of the disclosed techniques.

FIG. 8A illustrates an example wireless relay configuration 800. A satellite 802 transmits a radio frequency satellite signal that is received by antenna 804, passively retransmitted by antenna 806, and received by a receive chain 300 as described previously with respect to FIG. 3.

Figure 8B:
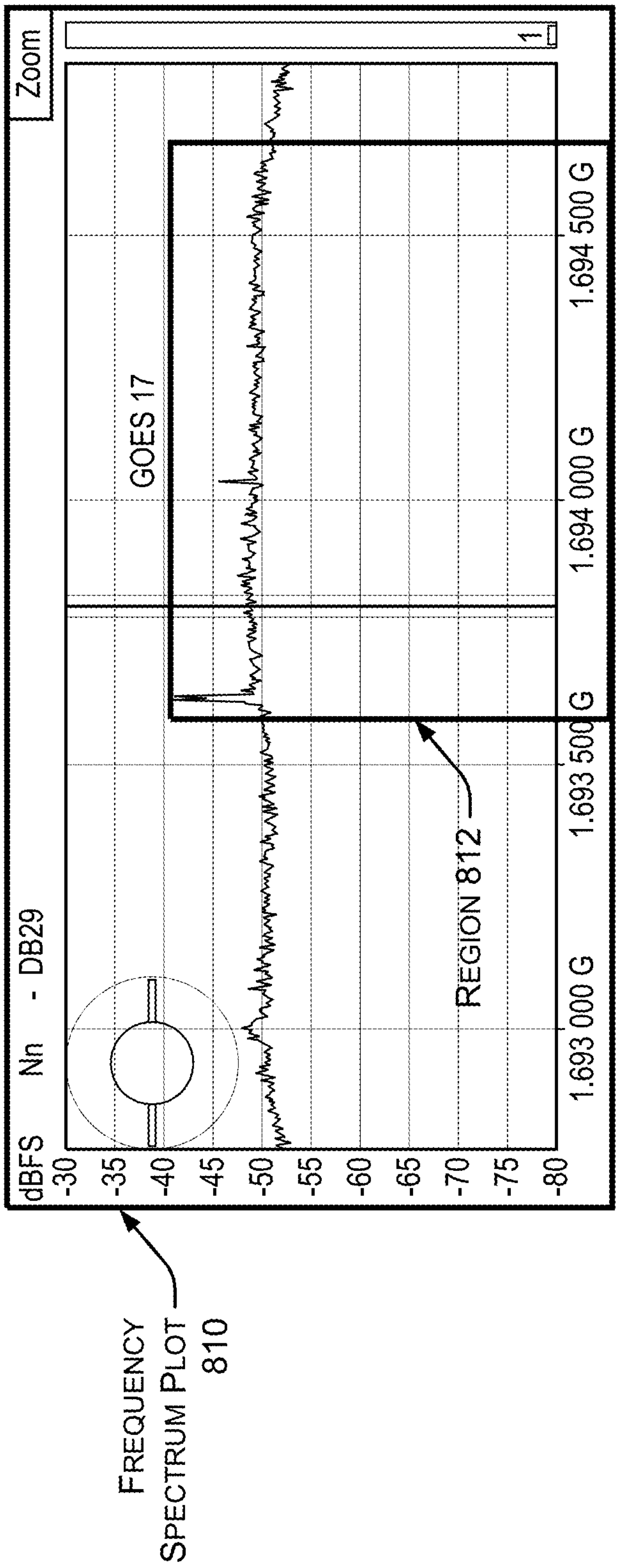
FIGS. 8B and 8C illustrate example experimental results obtained using a wireless relay for satellite backscatter communication, consistent with some implementations of the disclosed techniques.

FIG. 8B illustrates a frequency spectrum plot 810 detected using wireless relay configuration 800 described above with respect to FIG. 8A. Note that the frequency spectrum plot includes region 812 corresponding to the spectrum occupied by a radio frequency satellite signal transmitted by the GOES 17 satellite, which is an imaging satellite in geostationary orbit.

Figure 8C:
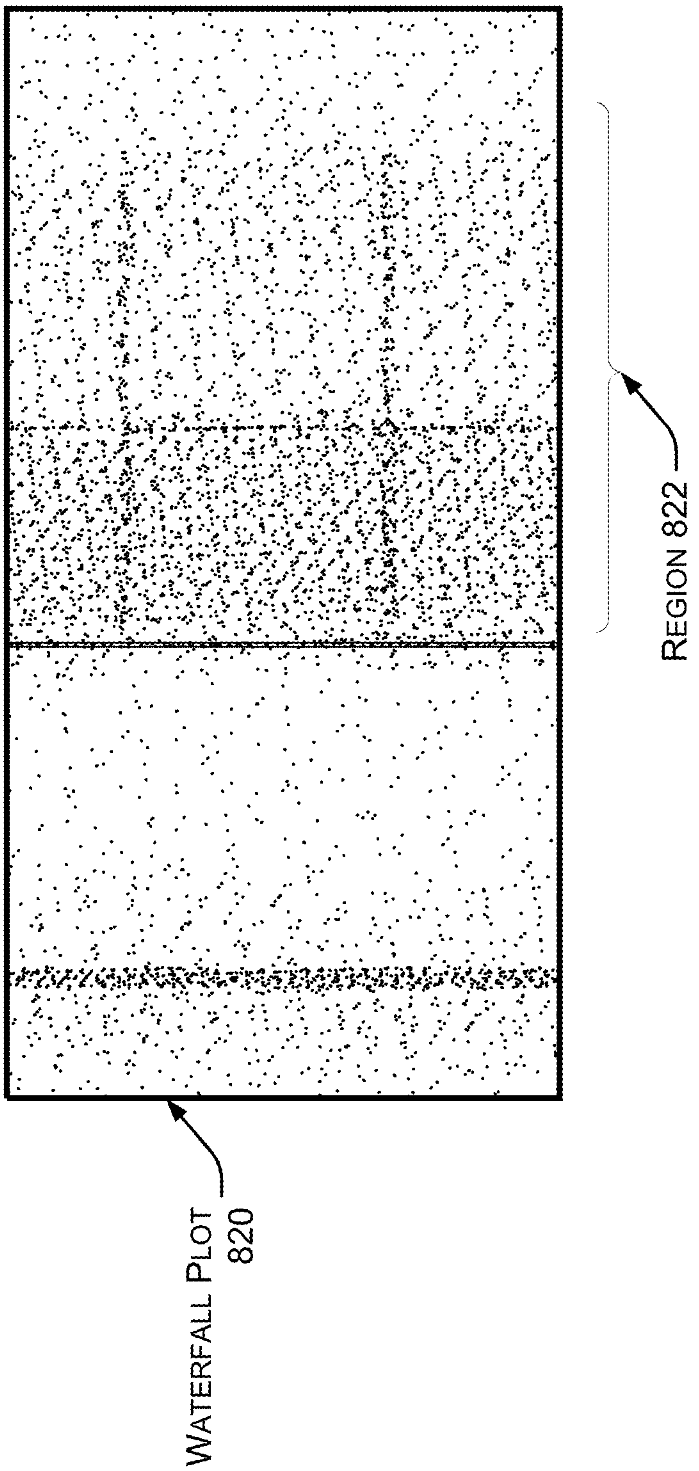

FIG. 8C illustrates a waterfall plot 820, which shows a corresponding region 822 with relatively high power compared to the adjacent frequency bands. This conveys that the wireless relay configuration 800 is able to detect the radio frequency satellite signal produced by GOES 17, which in turn implies that the signal can be modulated to communicate information via backscattering as described previously.

Example System

Figure 9:
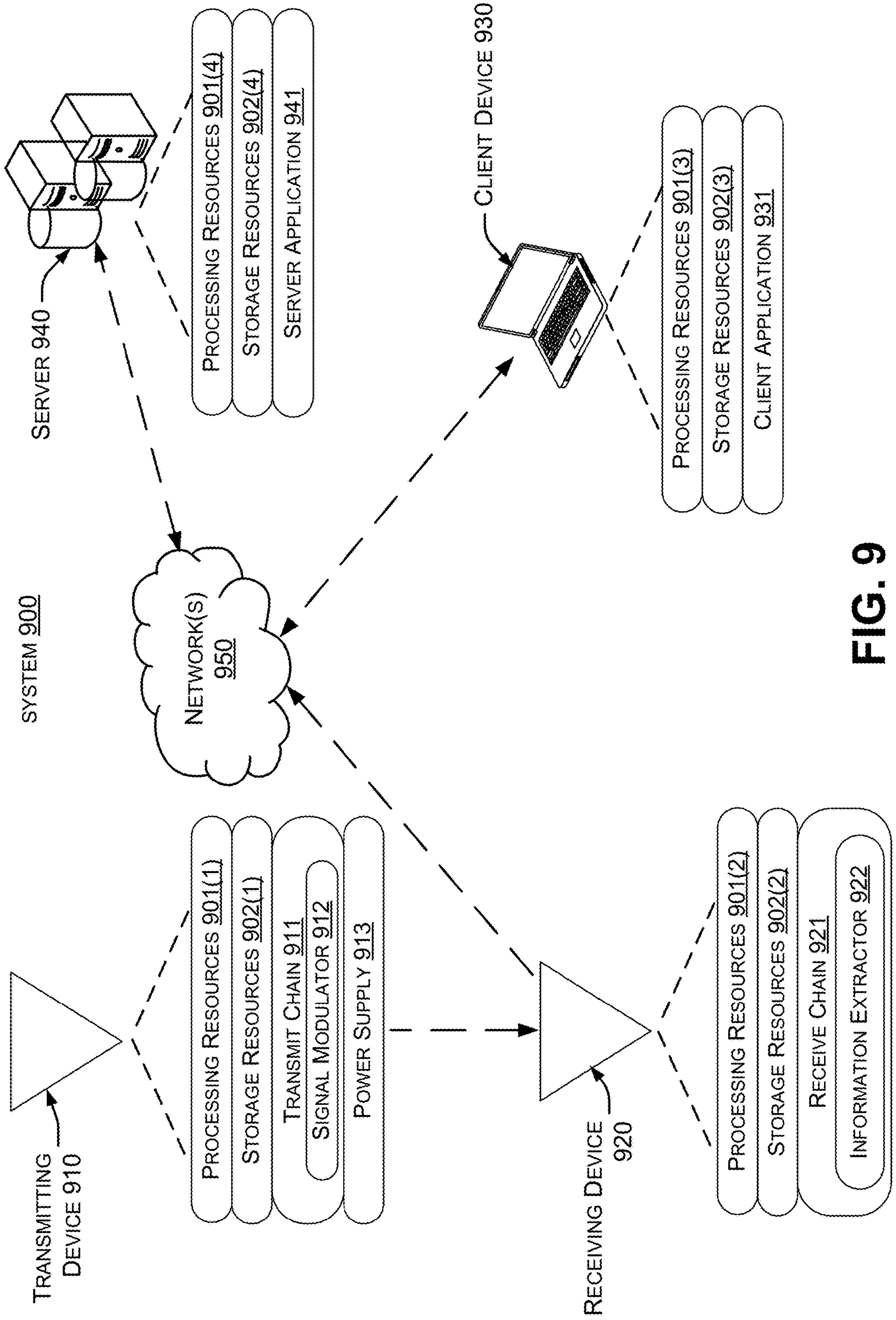
FIG. 9 illustrates an example system in which satellite backscatter communication can be performed, consistent with some implementations of the disclosed techniques.

The present implementations can be performed in various scenarios on various devices. FIG. 9 shows an example system 900 in which the present implementations can be employed, as discussed more below.

As shown in FIG. 9, system 900 includes a transmitting device 910, a receiving device 920, a client device 930, and a server 940, connected by one or more network(s) 950. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 9, but particularly the servers, can be implemented in data centers, server farms, etc.

Certain components of the devices shown in FIG. 9 may be referred to herein by parenthetical reference numbers. For the purposes of the following description, the parenthetical (1) indicates an occurrence of a given component on transmitting device 910, (2) indicates an occurrence of a given component on receiving device 920, (3) indicates an occurrence on client device 930, and (4) indicates an occurrence on server 940. Unless identifying a specific instance of a given component, this document will refer generally to the components without the parenthetical.

Generally, the devices 910, 920, 930, and/or 940 may have respective processing resources 901 and storage resources 902, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Transmitting device 910 can include a transmit chain 911, such as transmit chain 100 shown in FIG. 1 and/or transmit chain 200 as shown in FIG. 2. The transmit chain 911 can include a signal modulator 912 which can modulate a received satellite signal. Examples of signal modulators include a switch and an open circuit as described with respect to transmit chain 100 or a switch and a short circuit as described with respect to transmit chain 200. Note, however, that signal modulator 912 can include any circuit that can modulate one or more characteristics of an RF signal. For instance, signal modulator 912 can include any circuit that can modulate the amplitude, frequency, and/or phase of an RF signal.

Transmitting device 910 can also include a power supply 913. For instance, the power supply can include a conventional battery charged via grid power or a solar-powered battery charged via solar radiation. In other implementations, the power supply can harvest RF energy from a satellite using a capacitor charged by a rectifier. Note also that the processing resources for the transmitter can include a low-power microcontroller that can be powered using a capacitor charged by harvesting RF energy. In these scenarios, the low-power microcontroller could be intermittently powered on to perform compute functions each time the capacitor charges up to a designated charge state. In scenarios where a conventional or solar-powered battery is employed, a computing device such as a Raspberry Pi could be employed instead.

Receiving device 920 can include a receive chain 921, such as receive chain 300 described above with respect to FIG. 3. The receive chain can include an information extractor 922, e.g., a circuit to extract information from a retransmitted satellite signal. For instance, the information extractor can include a software-defined radio 318 as shown in FIG. 3. In other cases, the information extractor can include radio hardware, such as an envelope detector configured to extract information from a retransmitted satellite signal by converting the signal to a pulsed DC signal.

The transmitting device 910 can send a message to the receiving device 920 using a backscattered radio frequency satellite signal as described herein. The receiving device can forward the message to client device 930 and/or server 940 over network(s) 950. As described more below, a client application 931 on the client device and/or a server application 941 on the server can process the message. For instance, the message can be an emergency message, a personal communication, a sensor reading, etc.

Example Transmit Method

Figure 10:
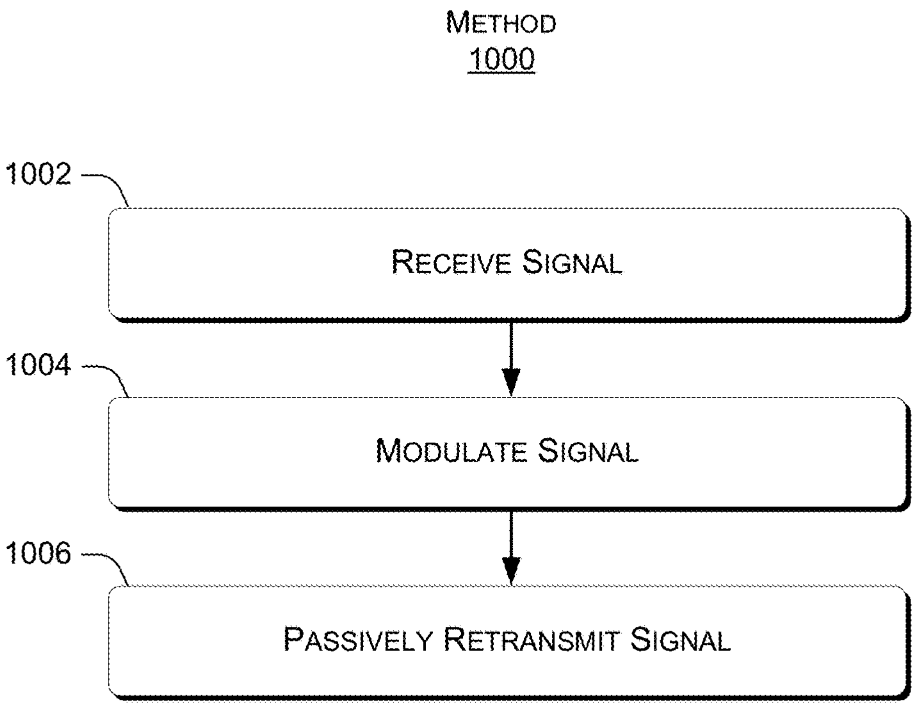
FIG. 10 illustrates an example method or technique for transmitting information using satellite backscatter communication, consistent with some implementations of the disclosed techniques.

FIG. 10 illustrates an example method 1000, consistent with some implementations of the present concepts. Method 1000 can be implemented on many different types of devices, e.g., by one or more cloud servers, by a client device such as a laptop, tablet, or smartphone, or by combinations of one or more servers, client devices, etc.

Method 1000 begins at block 1002, where a radio frequency satellite signal is received. For instance, the radio frequency satellite signal can be received from a satellite in low earth orbit or geostationary orbit, such as a GPS satellite, a synthetic aperture radar (SAR) satellite, an imaging satellite, etc. In some cases, the radio frequency satellite signal is received by a directional antenna pointed toward the satellite.

Method 1000 continues at block 1004, where the radio frequency satellite signal is modulated according to a communication scheme to obtain a modulated radio frequency satellite signal. One example communication scheme involves on-off keying, where the transmitter is switching between two states. Here, a 0-bit can be transmitted by staying in open circuit state (or short circuit, or 50Ω), while a 1-bit is transmitted by switching between the two states (open circuit and antenna pointing towards satellite) at a specific frequency.

Method 1000 continues at block 1006, where the modulated radio frequency satellite signal is passively retransmitted, e.g., without being amplified. In some cases, the modulated radio frequency satellite signal is passively transmitted via a directional antenna pointed toward a receiver.

Example Receive Method

Figure 11:
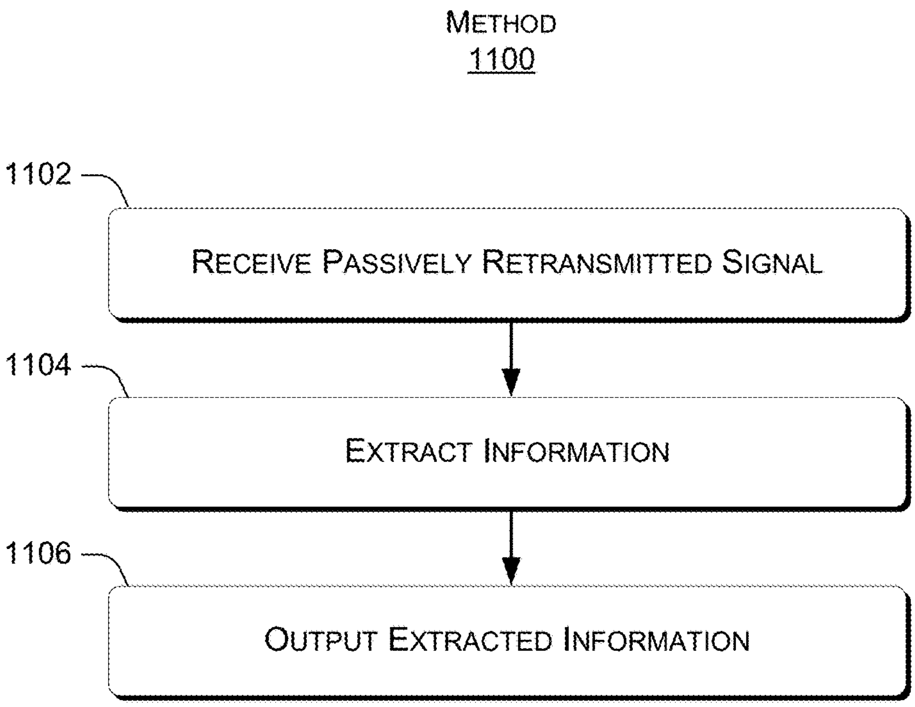
FIG. 11 illustrates an example method or technique for receiving information via satellite backscatter communication, consistent with some implementations of the disclosed techniques.

FIG. 11 illustrates an example method 1100, consistent with some implementations of the present concepts. Method 1100 can be implemented on many different types of devices, e.g., by one or more cloud servers, by a client device such as a laptop, tablet, or smartphone, or by combinations of one or more servers, client devices, etc.

Method 1100 begins at block 1102, where a passively retransmitted radio frequency satellite signal is received. For instance, the passively retransmitted radio frequency satellite signal can be a backscattered signal originating from a satellite in low earth orbit or geostationary orbit, such as a GPS satellite, a synthetic aperture radar (SAR) satellite, an imaging satellite, etc. In some cases, the passively retransmitted radio frequency satellite signal is received by a directional antenna pointed toward a transmitting device that modulated and backscattered the radio frequency satellite signal.

Method 1100 continues at block 1104, where information is extracted from the passively retransmitted radio frequency satellite signal. For instance, ON/OFF keying symbols can be extracted using a matching waveform at the receiving device.

Method 1100 continues at block 1106, where the extracted information is output. For instance, the extracted information can be a sequence of bits that can be output to a software application on the receiving device, such as an operating system, a user-facing application, a database application, etc. In other cases, the receiving device can retransmit the sequence of bits over a network to another device, can output the sequence of bits to control local hardware connected to the receiving device, etc.

Application Scenarios

The disclosed techniques can be employed to provide low-power radio frequency communication for a variety of applications. For instance, consider a scenario where temperature or humidity sensors are deployed in a rural area, e.g., to monitor ecological conditions in a particular ecosystem or for agricultural purposes. Each sensor might spend years transmitting a temperature or humidity reading once per minute. Conventionally, the sensors would use batteries that need to be replaced periodically. Television or FM radio backscatter might not be appropriate if the sensors are located far from the nearest television or FM radio tower. Using satellite backscatter, each sensor can periodically transmit temperature or humidity readings while being powered by radio frequency energy from a satellite.

In this example, each sensor might include its own satellite backscatter transmitter and communicate with a single satellite backscatter receiver. The receiver could have an omnidirectional antenna and each sensor could have a directional antenna pointed at the receiver. The receiver might upload sensor data to a server application that monitors weather conditions to decide when a farmer should plant or harvest a crop, or fertilize a field. The server application could then send a notification to a client application that conveys, to the farmer, that they should plant, harvest, or fertilize at that time.

As another example, consider an emergency beacon. Conventional emergency beacons use a relatively large, heavy, and expensive battery expected have a shelf life of several years provided the beacon is not activated. By using a satellite backscatter transmitter in an emergency beacon, a user can send an emergency signal from anywhere on earth without needing to worry about whether the emergency beacon has a battery with sufficient remaining life to request help. In some cases, the emergency signal can be transmitted to a different satellite other than the satellite that originally transmitted the signal, as shown above in communication scenario 500. In other cases, the emergency signal can be retransmitted back to the same satellite that originally transmitted the signal, as shown above in communication scenario 600.

In this example, the satellite could send a signal to a server application with the location of the emergency signal. The server application could communicate with one or more instances of a client application, e.g., an emergency services location used by authorities in the vicinity of the emergency signal. The server application could also send a message to one or more designated contacts of the person that activated the rescue beacon.

As another example, consider a remote messaging application. Two individuals located on different sides of a steep mountain in a remote area might have difficulty communicating with each other using conventional technologies. For instance, the area might be devoid of cellular service, and a conventional walkie-talkie signal might be blocked by the steep mountain. Each user can have a communication device that includes both a satellite backscatter transmitter and a satellite backscatter receiver, and can communicate with one another by backscattering messages via one or more satellites. Since satellite signals are available in many locations without cellular service and are less likely to be blocked by terrain, the messaging application could enable the users to communicate.

As another example, consider a military application where a remote sensor might be left in a dangerous location to monitor for vehicle traffic. A soldier might place the remote sensor in that location and leave the sensor there for a long period of time. By using a sensor with a satellite backscatter transmitter, the soldier might not need to return to replace batteries in the sensor, thus ensuring the safety of the soldier while still enabling the soldier to monitor for vehicle traffic at the dangerous location.

As noted, some implementations may backscatter satellite signals from existing satellites for other applications, such as GPS, SAR, or imaging satellites. However, in some cases, dedicated satellites can be deployed for use with backscattering transmitters and receivers. In such implementations, the satellites may utilize waveforms with specific characteristics selected for backscatter communication, e.g., a unique frequency band, modulation characteristics selected for high communication bandwidth, etc. As but one example, lower frequency waveforms tend to travel longer distances, so a relatively low frequency band that is not crowded by other RF technologies could be selected for a satellite that is dedicated for backscatter communication.

Communication Schemes

As noted above, some implementations may employ on-off keying to transmit bits, where communicating a 1-bit involves backscattering a received radio frequency satellite signal and communicating a 0-bit involves not backscattering the signal. In some cases, error correction codes, compression techniques, and/or encryption techniques can be applied to determine which bits to send. The receiver can be configured to extract information according to the communication scheme using the corresponding error recovery, decompression, and/or decryption techniques to recover the transmitted data.

In some implementations, the receiver can synchronize to the original radio frequency satellite signal so that cross-correlation techniques can be employed to extract information. For instance, assume the transmitter generates a 100 Hz signal representing a 1-bit. The receiver can generate a 100 Hz square wave and multiply that signal by the signal received from the transmitter. When the transmitter is sending the 1-bit signal, the multiplication will result in a high peak when integrated over time to allow detection of the 1-bit. When the transmitter is directing the signal to a short or open circuit, the signals will not integrate to a peak at the receiver, thus allowing the receiver to detect a 0-bit. Thresholding techniques can be applied to the multiplied signal to determine whether a 0- or 1-bit is being received.

Technical Effect

The disclosed implementations offer several technical improvements over conventional radio frequency communication techniques. As noted previously, conventional radio frequency communication tends to involve an active transmitter that consumes relatively high power. As a consequence, conventional radio frequency transmitters tend to be powered using electricity grids and/or batteries. Grid power is a major limitation because electricity is not available in all locations and, even in urban areas with extensive power grids, it is not always desirable to plug a transmitter into an electrical outlet. Batteries can be utilized in locations where grid power is not available or convenient, but batteries can be heavy, expensive, and still require periodic recharging.

Backscatter communication generally allows for low-power transmitters to be employed, but as noted previously, conventional backscatter techniques tend to use signals that are geographically limited. For instance, a television or FM radio signal may tend to be very weak in rural area, and backscattering such a signal would tend to result in very limited bandwidth at best.

Furthermore, conventional backscatter communication typically involves the use of a single antenna, where information is modulated by switching between impedance states. In the disclosed transmit chains shown in FIGS. 1 and 2, multiple antennas are employed and switching is performed between an impedance-matched antenna and an open or short circuit. The use of multiple antennas allows for information to be communicated despite the relatively low signal strength of satellite signals.

Unlike television or FM radio signals, satellite signals are available almost everywhere on earth with sufficient power to successfully employ backscatter communication. Furthermore, RF power harvesting techniques can allow satellite signals to not only be encoded with information, but also to provide power to a transmitter. As a consequence, a satellite backscatter transmitter can be relatively lightweight and inexpensive, and users do not necessarily need to periodically revisit such a transmitter to change out batteries.

In addition, because there are many satellites in existence with different waveform characteristics, it is difficult to intercept backscattered communications without knowledge of the satellite being backscattered. Only a receiver that has been preconfigured to synchronize to a particular satellite signal is likely to successfully recover information conveyed by backscattered signals. As a consequence, satellite backscatter communication can be performed in a secure manner.

Device Implementations

As noted above with respect to FIG. 9, system 900 includes several devices, including a transmitting device 910, a receiving device 920, a client device 930, and a server 940. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), neural processing units (NPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 950. Without limitation, network(s) 950 can include one or more local area networks (LANs), wide area networks (WANs), the Internet, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

Various examples are described above. Additional examples are described below. One example includes a satellite backscatter transmitter comprising a first antenna configured to receive a radio frequency satellite signal, a modulator configured to modulate the radio frequency satellite signal to obtain a modulated radio frequency satellite signal, a digital logic circuit configured to selectively control the modulator to encode information according to a communication scheme, and a second antenna configured to passively retransmit the modulated radio frequency satellite signal to a receiver.

Another example can include any of the above and/or below examples where the modulator comprises a switch.

Another example can include any of the above and/or below examples where the switch is configured to switch between the first antenna and an open circuit.

Another example can include any of the above and/or below examples where the switch is configured to switch between the first antenna and a short circuit.

Another example can include any of the above and/or below examples where the communication scheme comprises on-off keying.

Another example can include any of the above and/or below examples where the digital logic circuit comprises a microcontroller.

Another example can include any of the above and/or below examples where the microcontroller is powered by the radio frequency satellite signal.

Another example can include any of the above and/or below examples where the microcontroller is powered by solar radiation.

Another example can include any of the above and/or below examples where the first antenna is directional and pointed toward a particular satellite.

Another example can include any of the above and/or below examples where the second antenna being directional and pointed toward the receiver.

Another example includes a satellite backscatter receiver comprising an antenna configured to receive a passively retransmitted radio frequency satellite signal from a satellite backscatter transmitter and a circuit configured to extract information from the passively retransmitted radio frequency satellite signal.

Another example can include any of the above and/or below examples where the circuit comprises a processor configured with instructions to implement a software-defined radio.

Another example can include any of the above and/or below examples where the software-defined radio implemented in a computing device has a processing unit and a memory.

Another example can include any of the above and/or below examples where the circuit comprises radio hardware.

Another example can include any of the above and/or below examples where the satellite backscatter receiver further comprises a bandpass filter tuned to a frequency of the radio frequency satellite signal.

Another example can include any of the above and/or below examples where the bandpass filter is configured to receive an amplified radio frequency satellite signal from the low-noise amplifier, the circuit is configured to receive a filtered radio frequency satellite signal from the bandpass filter.

Another example includes a method comprising receiving a radio frequency satellite signal, modulating the radio frequency satellite signal using a communication scheme to obtain a modulated radio frequency satellite signal, and passively retransmitting the modulated radio frequency satellite signal.

Another example can include any of the above and/or below examples where passively retransmitting the modulated radio frequency satellite signal comprises directing the retransmitted radio frequency satellite signal back to a particular satellite from which the radio frequency satellite signal was received.

Another example can include any of the above and/or below examples where passively retransmitting the modulated radio frequency satellite signal comprises directing the retransmitted radio frequency satellite signal to a different satellite than the satellite from which the radio frequency satellite signal was received.

The invention claimed is:

1. A system comprising:

an environmental sensor configured to sense an environment at a location on earth and output environmental sensor readings characterizing the environment;

a satellite backscatter transmitter comprising:

a first antenna configured to receive a radio frequency satellite signal;

a modulator configured to modulate the radio frequency satellite signal to obtain a modulated radio frequency satellite signal;

a digital logic circuit configured to selectively control the modulator to encode the environmental sensor readings in the modulated radio frequency satellite signal according to a communication scheme; and a second antenna configured to passively retransmit the modulated radio frequency satellite signal having the encoded sensor readings; and a receiving device configured to:

receive the passively retransmitted radio frequency satellite signal;

extract the environmental sensor readings from the passively retransmitted radio frequency satellite signal; and send the environmental sensor readings that characterize the environment at the location on earth over a computer network to a client device having a client application configured to process the environmental sensor readings.

2. The system of claim 1, the modulator comprising a switch.

3. The system of claim 2, the switch configured to switch between the first antenna and an open circuit when encoding the environmental sensor readings in the modulated radio frequency satellite signal.

4. The system of claim 2, the switch configured to switch between the first antenna and a short circuit when encoding the environmental sensor readings in the modulated radio frequency satellite signal.

5. The system of claim 2, the communication scheme comprising on-off keying.

6. The system of claim 1, the digital logic circuit comprising a microcontroller.

7. The system of claim 6, the microcontroller being powered by the radio frequency satellite signal.

8. The system of claim 6, the microcontroller being powered by solar radiation.

9. The system of claim 1, the first antenna being directional and pointed toward a particular satellite.

10. The system of claim 6, the second antenna being directional and pointed toward the receiving device.

11. A method comprising:

receiving a radio frequency satellite signal at a location on earth;

receiving environmental sensor readings from a sensor, the environmental sensor readings characterizing an environment at the location on earth;

modulating the radio frequency satellite signal, the modulating resulting in a modulated radio frequency satellite signal that encodes the environmental sensor readings according to a communication scheme;

passively retransmitting the modulated radio frequency satellite signal that encodes the environmental sensor readings;

receiving the passively retransmitted radio frequency satellite signal at a receiving device;

extracting the environmental sensor readings from the passively retransmitted radio frequency satellite signal; and sending the environmental sensor readings that characterize the environment at the location on earth over a computer network to a client device having a client application configured to process the environmental sensor readings.

12. The method of claim 11, wherein passively retransmitting the modulated radio frequency satellite signal comprises directing the retransmitted radio frequency satellite signal having the encoded environmental sensor readings back to a particular satellite from which the radio frequency satellite signal was received.

13. The method of claim 11, wherein passively retransmitting the modulated radio frequency satellite signal comprises directing the retransmitted radio frequency satellite signal having the encoded environmental sensor readings to a different satellite than the satellite from which the radio frequency satellite signal was received.

14. The method of claim 11, wherein passively retransmitting the modulated radio frequency satellite signal comprises directionally transmitting the retransmitted radio frequency satellite signal having the encoded environmental sensor readings toward the receiving device located on earth.

15. The method of claim 11, wherein the modulating comprises encoding the environmental sensor readings by selectively routing the radio frequency satellite signal to a resistive shunt.

16. The method of claim 11, wherein the modulating comprises encoding the environmental sensor readings by varying impedance of a circuit in a transmit chain carrying the radio frequency signal.

17. The method of claim 11, wherein the modulating comprises encoding the environmental sensor readings by modulating an amplitude of the radio frequency satellite signal.

18. The method of claim 11, wherein the modulating comprises encoding the environmental sensor readings by modulating a frequency of the radio frequency satellite signal.

19. The method of claim 11, wherein the modulating comprises encoding the environmental sensor readings by modulating phase of the radio frequency satellite signal.

20. The method of claim 11, further comprising:

harvesting radio frequency energy from the radio frequency satellite signal; and powering a transmitting device that performs the passively retransmitting with the harvested radio frequency energy.

21. The method of claim 20, further comprising:

harvesting radio frequency energy from the radio frequency satellite signal using a rectifier to charge a capacitor; and powering a transmitting device that performs the passively retransmitting with the capacitor.

22. A system comprising:

an environmental sensor configured to sense an environment at a location on earth and output environmental sensor readings characterizing the environment;

a satellite backscatter transmitter; and a receiving device having a satellite backscatter receiver, the satellite backscatter transmitter comprising:

a first antenna configured to receive a radio frequency satellite signal;

a modulator configured to modulate the radio frequency satellite signal to obtain a modulated radio frequency satellite signal;

a digital logic circuit configured to selectively control the modulator to encode the environmental sensor readings according to a communication scheme; and a second antenna configured to passively retransmit the modulated radio frequency satellite signal, the satellite backscatter receiver comprising:

a third antenna configured to receive the modulated radio frequency satellite signal from the satellite backscatter transmitter; and a circuit configured to extract the environmental sensor readings from the modulated radio frequency satellite signal, wherein the receiving device is configured to send the environmental sensor readings that characterize the environment at the location on earth over a computer network to a client device having a client application configured to process the environmental sensor readings.

23. The system of claim 22, wherein the first antenna is configured to receive a first L-band radio frequency satellite signal that does not encode the environmental sensor readings and the second antenna is configured to retransmit a second modulated L-band radio frequency satellite signal that encodes the environmental sensor readings.

24. The method of claim 11, further comprising:

passively retransmitting the modulated radio frequency satellite signal to the receiving device using a directional antenna pointed at the receiving device; and receiving the modulated radio frequency satellite signal at the receiving device using an omnidirectional antenna.

* * * * *